US012172793B2

United States Patent
Terzini

(10) Patent No.: US 12,172,793 B2
(45) Date of Patent: Dec. 24, 2024

(54) CARTON-HANDLING AND ORDER FULFILLMENT SYSTEM

(71) Applicant: Tension International, Inc., Kansas City, MO (US)

(72) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 0 days.

(21) Appl. No.: 17/461,320

(22) Filed: Aug. 30, 2021

(65) Prior Publication Data

US 2022/0081138 A1  Mar. 17, 2022

Related U.S. Application Data

(60) Provisional application No. 63/072,463, filed on Aug. 31, 2020.

(51) Int. Cl.
| | |
|---|---|
| *B65B 7/16* | (2006.01) |
| *B65B 7/28* | (2006.01) |
| *G06Q 10/08* | (2023.01) |
| *G06Q 50/28* | (2012.01) |

(52) U.S. Cl.
CPC ............ *B65B 7/162* (2013.01); *B65B 7/2842* (2013.01); *G06Q 10/08* (2013.01); *B65B 2230/00* (2013.01)

(58) Field of Classification Search
None
See application file for complete search history.

(56) References Cited

U.S. PATENT DOCUMENTS

| | | | | |
|---|---|---|---|---|
| 3,029,570 A | * | 4/1962 | Strakosch, Jr. | ........ B65B 7/2871 |
| | | | | 53/64 |
| 3,297,153 A | * | 1/1967 | Fattori | ................... B65D 55/06 |
| | | | | 220/325 |
| 3,509,682 A | * | 5/1970 | Logemann | ................ B65B 7/01 |
| | | | | 53/298 |
| 7,918,402 B2 | | 4/2011 | Conlon et al. | |
| 9,844,846 B2 | | 12/2017 | Terzini | |
| 11,485,533 B1 | * | 11/2022 | Hoffman | ................. B65B 5/028 |

(Continued)

FOREIGN PATENT DOCUMENTS

| | | | | |
|---|---|---|---|---|
| WO | WO-2017114598 A1 | * | 7/2017 | ............. B65B 25/00 |
| WO | WO-2020084765 A1 | * | 4/2020 | ............. A24F 40/70 |

*Primary Examiner* — Tanzim Imam
(74) *Attorney, Agent, or Firm* — AVEK IP, LLC; Kent R. Erickson

(57) ABSTRACT

An order fulfillment system is described that includes a carton and a mover configured to carry the carton throughout the system. The carton is a preformed, five-sided container with flanges extending outwardly from edges thereof. The mover includes a depression in a top surface thereof that nestably receives the carton therein. The mover may include a vacuum system to aid retention of the carton therein. The mover and carton may include indicia to enable identification and tracking thereof throughout the fulfillment process. A lidding process applies a lid that is adhered to the flanges of the carton and includes identifying indicia thereon. The system provides identification and verification of items placed in the carton and can be easily integrated into existing manual and automated fulfillment systems. A manual system allows a user to manually pick and load cartons and attach a carton lid via an adhesive.

20 Claims, 12 Drawing Sheets

(56) References Cited

U.S. PATENT DOCUMENTS

| | | | |
|---|---|---|---|
| 2013/0214469 A1* | 8/2013 | Terzini | B23Q 1/032 |
| | | | 269/287 |
| 2013/0310969 A1* | 11/2013 | Terzini | G06Q 10/087 |
| | | | 700/235 |
| 2017/0210498 A1* | 7/2017 | Jenkins | B65B 7/2864 |
| 2018/0346229 A1* | 12/2018 | Guerdrum | B65D 21/086 |
| 2019/0258910 A1* | 8/2019 | Stoman | G06K 19/06028 |

* cited by examiner

CARTON-HANDLING AND ORDER FULFILLMENT SYSTEM

CROSS-REFERENCE TO RELATED APPLICATIONS

This application claims the benefit of U.S. Provisional Patent Application No. 63/072,463, filed Aug. 31, 2020, the disclosure of which is hereby incorporated herein in its entirety by reference.

BACKGROUND

Longer onboarding and training, rising benefit and compensation rates, and shortages in labor are driving more and more warehousing, distribution, and fulfillment facilities to invest in automated solutions for operations. As the technologies improve and the applications become wider and more flexible, robotics are being adopted by a greater number of warehouse operations throughout the world.

Companies have found that the lower cost of capital, faster return on investment, and modularity of automation through robotics offer a renewed opportunity to make incremental investments that can be recouped in a reasonable amount of time. In addition, companies can buy what they need as volumes dictate and build capabilities, as opposed to a significant upfront capital investment. Modularity of the robotic systems is a key selling point for all automation manufacturers.

Robotic systems however often struggle with tracking and/or traceability of products being handled thereby. In pick-and-pack and order fulfillment facilities, products retrieved and handled must be verified with respect to a particular order. Those verified products must then be placed into a package for shipping to the end user or consumer. Tracking the products from order, to retrieval, to packaging, and on to shipping can be difficult due to a lack of a common tracking identifier(s) that are monitored by the robotic systems and where human oversight is replaced with robotic processing.

Additionally, robotic processing apparatus often struggle with some types of packages and containers into which products are disposed for shipping to an end user or consumer. Many facilities are pushing for more environmentally safe packages or bags that reduce resource consumption and that are more easily recyclable. These packages however are often of thinner material stock that may be more flexible or pliable making robotic handling more troublesome.

SUMMARY

A high-level overview of various aspects of exemplary embodiments is provided here to introduce a selection of concepts that are further described in the detailed description section below. This summary is not intended to identify key features or essential features of embodiments, nor is it intended to be used in isolation to determine the scope of the described subject matter. In brief, this disclosure describes a carton-handling and order fulfillment system, method, and apparatus.

The system comprises a carton and a carton mover configured to carry the carton about an order fulfillment facility. The carton is a pre-formed, open-topped container configured to be nestably stackable with a plurality of similarly configured cartons for ease of transport, storage, and the like. Distal edges of the carton forming the perimeter of the open top thereof form outwardly folded flanges. The carton is preferably formed from a cardstock or similar sturdy paper stock that is lightweight and environmentally friendly but may be formed from other materials.

The mover comprises a cuboidal body having a depression in a top surface thereof that compliments the exterior of the carton to nestably receive the carton therein. When disposed in the depression, the flanges of the carton rest on and overlie a portion of a top surface of the mover. The mover includes a vacuum system within the body thereof that aids retention of the carton in the mover as they progress through the order fulfillment system.

The vacuum system includes a plurality of suction cups that are exposed to the top surface of the body and that underlie the flanges of the carton. Within the body of the mover are a series of passages that link the suction cups to vacuum-charging bellows and to a normally closed valve. The bellows are compressed to reduce a volume of the system and then expanded to draw a partial vacuum which applies a suction force between the suction cups and the flanges of the carton. The carton is thereby retained within the mover by the suction force. The valve may be actuated to relieve the vacuum and enable removal of the carton from the mover.

The mover is configured to be useable with available conveyance systems such as belt or roller driven systems and linear synchronous motor systems which may allow for independent movement and tracing of each mover within the system. The mover and carton are thus transported about an order fulfillment facility to receive items in the carton via a variety of manual or automated means. Items placed in the carton can be verified or cross-referenced via indicia disposed on the carton and/or associated with the mover and a variety of scanners or scanning devices disposed throughout the system.

A lidding operation applies a gum or other adhesive to each of the flanges of the carton. A lid for the carton may be formed from a continuous rolled material stock in-line with the carton processing and then applied to the carton, or a pre-cut lid may be picked and placed onto the carton. A label may be applied to or printed on the lid and data thereon cross-referenced with the indicia on the carton and/or the mover for verification. The carton may be transported to a sorting or other station and removed from the mover. The mover is returned for processing of a subsequent carton.

In an alternative embodiment, a manual lidding operation comprises a carton and a carton lid with either the carton or lid having an adhesive for securing the lid to the carton. A magazine containing cartons allows a user to pick and place a carton for loading items, and a magazine containing lids allows a user to pick and place a lid onto the carton with an adhesive securing the lid to the carton.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of embodiments. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Figure 1:
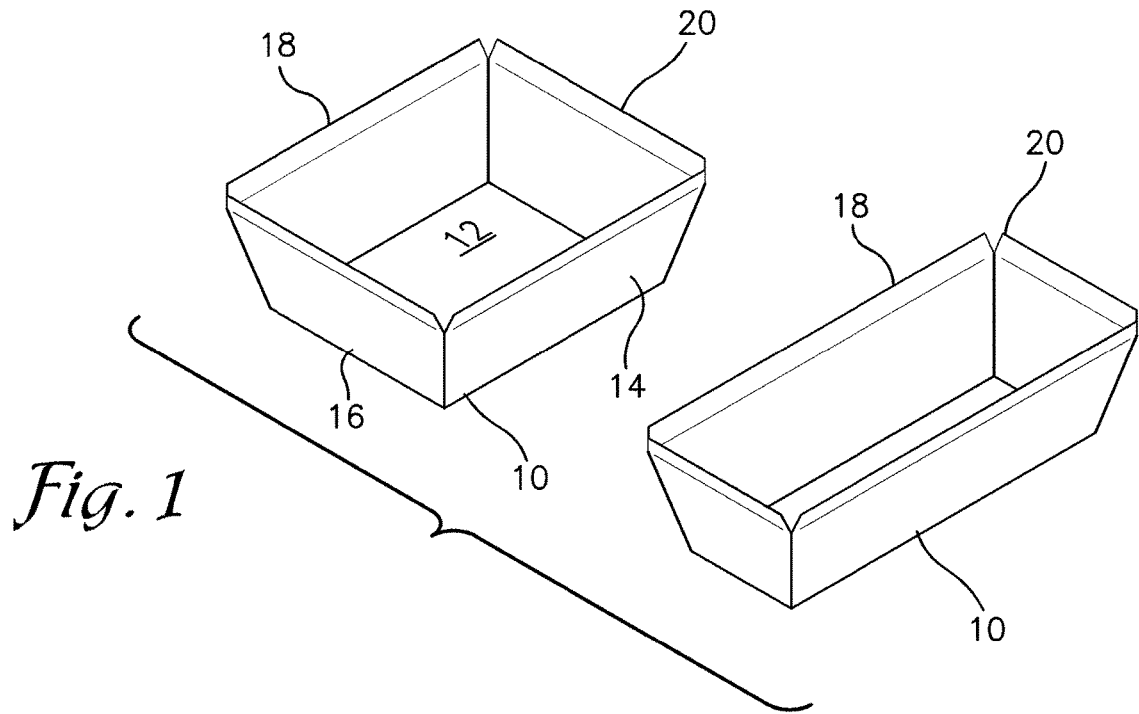
FIG. 1 is an illustrative view of two cartons with unfolded flanges depicted in accordance with an exemplary embodiment.
Figure 2:
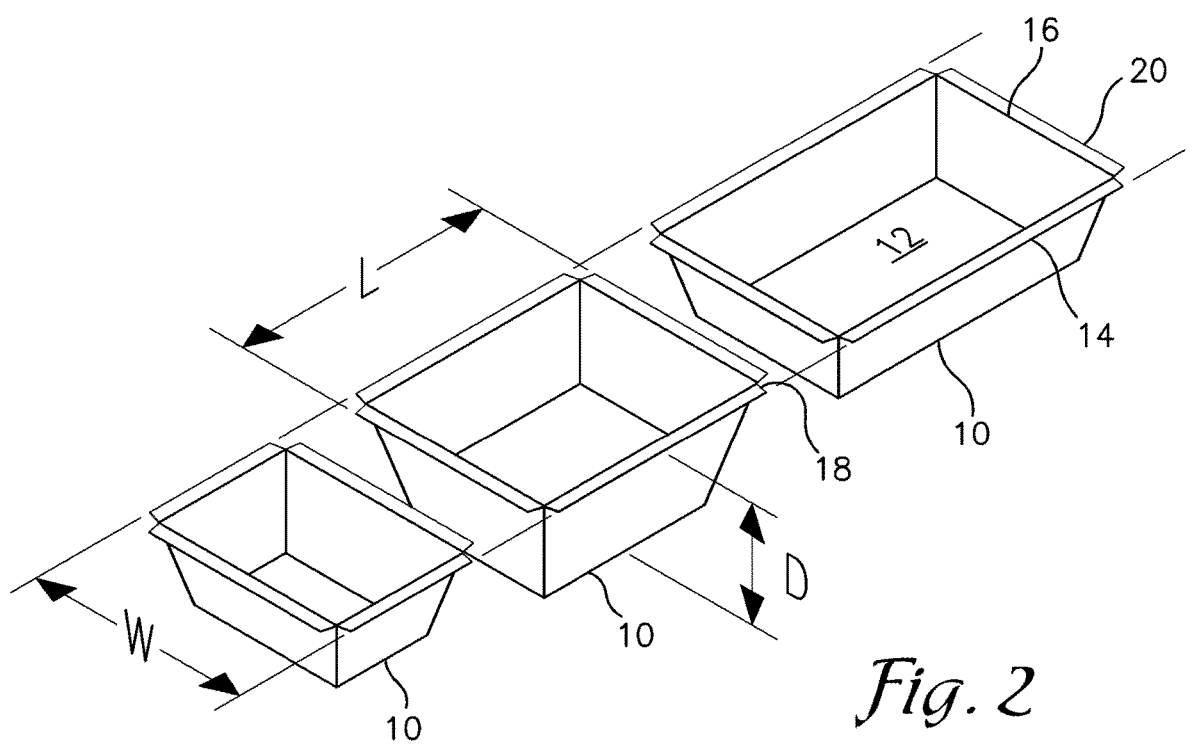
FIG. 2 is an illustrative view of three cartons with folded flanges depicted in accordance with an exemplary embodiment.
Figure 3:
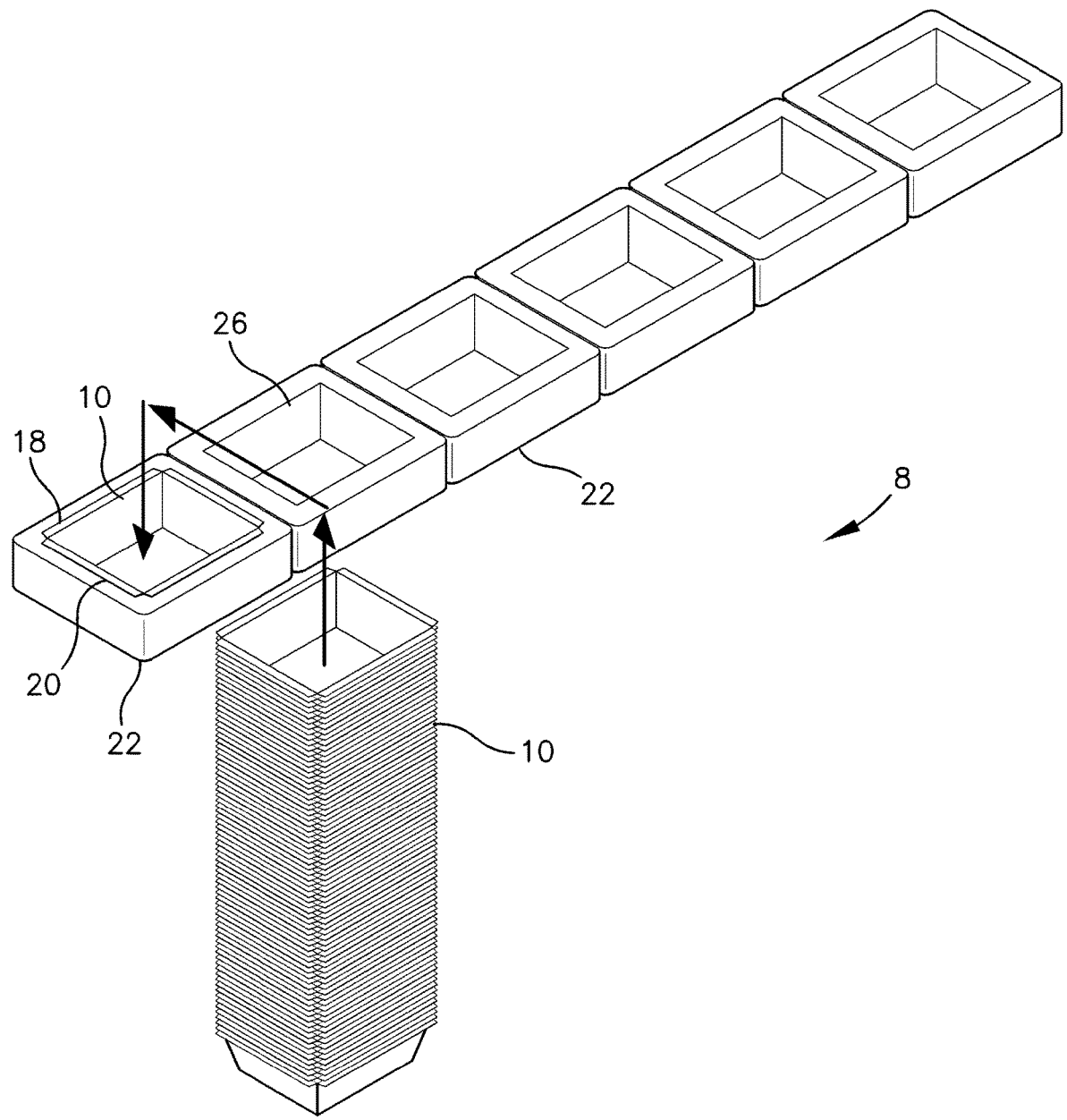
FIG. 3 is an illustrative view of a plurality of movers aligned as on a conveyance system and a stack of cartons depicted in accordance with an exemplary embodiment.

With initial reference to FIGS. 1-5, an order-fulfillment system 8 that includes a carton 10 and a mover 22 is described in accordance with an exemplary embodiment. The carton 10 comprises a preformed, polygonal container that includes a base wall 12, a pair of longitudinal walls 14, and a pair of transverse walls 16. The carton 10 is formed from a single, planar sheet of material that is stamped, cut, or otherwise provided with a desired preform-sheet configuration. Each of the longitudinal walls 14 and transverse walls 16 include a trapezoidal shape that is joined to a respective edge of the generally rectangular base wall 12. The preform-sheet is fed to a carton-forming machine or carton erector which folds the longitudinal and transverse walls 14,16 about their respective edges of the base wall 12 such that they are brought into abutment along side edges thereof to provide the carton with an open-faced, truncated, rectangular or four-sided pyramidal form. Such a form enables a plurality of the cartons 10 to be nestably stacked as depicted in FIG. 3. Or by using a carton erector or the like, the cartons 10 can be preformed on-demand and then inserted into a mover 22 as described below. In such an embodiment, the cartons 10 need not be stackable.

The longitudinal and transverse walls 14,16 may be coupled along their side edges via a tape or similar material applied across their joint. In one embodiment, overlapping tabs or flanges are provided along the side edges of one or more of the longitudinal and transverse walls 14, 16 which are folded against and adhered to the abutting longitudinal or transverse wall 14, 16.

Distal edges of the longitudinal and transverse walls 14, 16 opposite their union with the base wall 12 are provided with a longitudinal flange 18 or a transverse flange 20, respectively. The flanges 18, 20 extend beyond a termination of the coupled side edges of each of the longitudinal and transverse walls 14, 16. As depicted in FIG. 1, the flanges 18, 20 may remain in the same plane as their respective longitudinal or transverse wall 14, 16, or as depicted in FIG. 2, the flanges 18, 20 may be folded outwardly such that each of the flanges 18, 20 lies in generally the same plane and in a plane that is generally parallel to the base wall 12.

The carton 10 is preferably formed from a cardstock, cardboard, or other fiber board material, but may also be formed from a paper, plastics or composites, among a variety of other materials. Although the carton 10 is shown and described herein as a preformed article with the truncated pyramidal form, it is understood that the carton 10 may be formed by a variety of other methods and other forms without departing from the scope of embodiments described herein. For example, in one embodiment, the carton 10 is formed from a sheet of a plastic material that is stamped, pressed, or otherwise molded into the desired shape of the carton 10. In one embodiment, the carton 10 comprises a bag-like structure with the longitudinal and transverse flanges 18, 20 provided around an opening thereof. Additionally, exemplary embodiments are configured to employ a plurality of cartons 10, each of which may comprise the same or different materials, e.g. cartons 10 of various forms and constructions may be employed in a single embodiment.

With reference now to FIGS. 4-8, a mover 22 is described in accordance with an exemplary embodiment. The mover 22 includes a body 24 with a depression 26 centrally located in a top surface thereof. The depression 26 is provided with a form that is complimentary to that of an exterior of the carton 10 such that the carton 10 can be nestably placed into the depression 26 and carried by the mover 22. The depression 26 may be configured to accept a particular carton configuration or may be configured to accept a variety of carton configurations interchangeably.

The mover 22 is further configured to be accepted on and carried by a conveyance system. The conveyance system may comprise available conveyance systems that utilize belts or rollers to move items about a facility. In one embodiment, the conveyance system utilizes an electromagnetic propulsion system or linear synchronous motor technology in which each mover 22 is coupled to or carried by an independently moveable puck disposed on a track, like that described in U.S. patent application Ser. No. 16/839, 904, to Terzini, filed Apr. 3, 2020, the disclosure of which is incorporated herein by reference.

Each mover 22 may be provided with an identifying indicia such as a radio-frequency identification (RFID) chip 27 disposed in the body 24. The RFID chip 27 may be readable by apparatus disposed along a path of the mover 22 as it is moved about a facility to identify the mover 22, its contents, a carton 10 disposed therein, and to track movements thereof.

The mover 22 includes a series of suction cups 28 disposed about the perimeter of the depression 26 and exposed to a top surface of the mover 22. The suction cups 28 are positioned such that the longitudinal and transverse flanges 18, 20 of a carton 10 disposed in the depression 26 overlie the suction cups 28. In another embodiment, the suction cups 28 are disposed along other surfaces within the depression 26 instead of or in addition to the shown configuration and suction to one or more of the base wall 12, longitudinal walls 14, and/or transverse walls 16 to aid retention of the carton 10 in the mover 22.

A vacuum-charging system 30 is formed within the body 24 of the mover 22 and communicably coupled with the suction cups 28 to enable generation and/or application of a suction force between the suction cups 28 and the longitudinal and transverse flanges 18, 20 of the carton 10 sufficient to retain the carton 10 within the depression 26. Although a vacuum-based system is described herein, it is understood that other means such as mechanical, magnetic, chemical means, or no means at all may be employed to assist retention of the carton 10 within the mover 22.

The vacuum-charging system 30 includes a plurality of interconnected passageways through which a vacuum may be drawn. Although a particular configuration of the system 30 and components thereof is shown and described herein, it is understood that the components may be alternatively configured without departing from the scope of embodiments described herein. For example, components may be oriented vertically rather than horizontally or at some angle therebetween or may be routed differently while the functions and/or operations thereof remain the same. The system 30 includes a plurality of recesses 32 provided in the top surface of the mover 22 into which the suction cups 28 are disposed. A vertical bore 34 extends beneath each recess 32 and intersects a connecting bore 36 that extends horizontally within the body 24 of the mover 22 beneath rows of the suction cups 28 along the transverse and longitudinal sides of the depression 26. The connecting bore 36 is open to an exterior surface of the body 24 and forms a valve-housing 38 adjacent the exterior surface.

A valve 40 is disposed in the valve-housing 38 which, in a normal position, closes off the connecting bore 36 from the environment and, in an open position, opens the connecting bore 36 to a relief port 42 to relieve a vacuum formed within the system 30. As depicted in FIGS. 7 and 8, the valve 40 comprises a spring-biased, piston 44 that includes a finger 46 that extends from the exterior of the body 24 of the mover 22. In the normal position, a spring 48 biases the piston 44 outwardly from the body 24 such that the finger 46 protrudes from a side surface of the body 24 and a body of the piston 44 occludes communication between the connecting bore 36 and the relief port 42. Depression of the finger 46 and thus the piston 44 into the valve-housing 38 aligns a passage within the piston 44 with the relief port 42 to allow entrance of air into the system 30 and thus relief of the vacuum formed therein.

The system 30 further includes charging bores 50 that intersect the connecting bore 36 and extend toward and are open to a bottom surface of the mover 22. The charging bores 50 include a passageway 52 and an enlarged portion 54 within each of which is disposed a spring-biased bellows 56 that closes off the charging bore 50. An interior of each bellows 56 is open to the passageway 52. A coil spring 58 is disposed within the bellows 56 and between a shoulder 60 of the enlarged portion 54 and an endwall 62 of the bellows 56 to bias the endwall 62 away from the shoulder 60. Accordingly, compression of the bellows 56 toward the shoulders 60 forces air through the passageways 52 into the connecting bore 36 and through each of the suction cups 28. Conversely, expansion of the bellows 56 caused by extension of the coil springs 58 returning to their normal state, draws air inward through the suction cups 28 and into the system 30.

Each of the suction cups 28 includes an aperture 64 extending coaxially therethrough that connects to the vertical bore 34 and thus enables passage of air into and out of the system 30 as the bellows 56 are compressed/expanded. In another embodiment, another orifice may be provided to enable such air passage and may include a check valve, one-way valve, or similar structure to enable operation of the system 30 as further described below. In another embodiment, the suction cups 28 do not include the aperture 64, but rather are flexed via compression/expansion of the bellows 56. In yet another embodiment, the suction cups 28 are omitted or replaced by a plurality of similarly positioned orifices which may include one or more means disposed therearound for sealing with the longitudinal and transverse flanges 18, 20 of the carton 10.

With continued reference to FIGS. 1-5, a fulfillment process utilizing the carton 10 and the mover 22 is described in accordance with an exemplary embodiment. As described previously above, a plurality of the cartons 10 are preformed and provided in nested stacks as depicted in FIG. 3. A plurality of the movers 22 is provided on a conveyance system configured to transport the movers 22 about a warehouse or similar packing facility such that items can be picked and placed in each of the cartons 10. The items may be picked and placed by hand or by automated means.

Each carton 10 is removed from the stack and placed into the depression 26 in each of the movers 22. In embodiments where the longitudinal and transverse flanges 18, 20 are not pre-folded, a forming operation may be performed to fold the flanges 18, 20 onto the top surface of the mover 22. In another embodiment, the cartons 10 are preformed or erected in-line and are moved from a carton-forming machine directly into the mover 22.

As depicted in FIG. 2, the cartons 10 may be provided in a variety of sizes with varied lengths (L), widths (W), and depths (D), and the movers 22 may be similarly dimensioned to compliment a chosen carton dimension. Preferably, the cartons 10 are configured with a constant width dimension to aid design and construction of the conveyance system but other dimensions may be employed. In another embodiment, the movers 22 may be configured to handle cartons 10 of varied dimensions, like for example, varied depths.

Figure 8A:
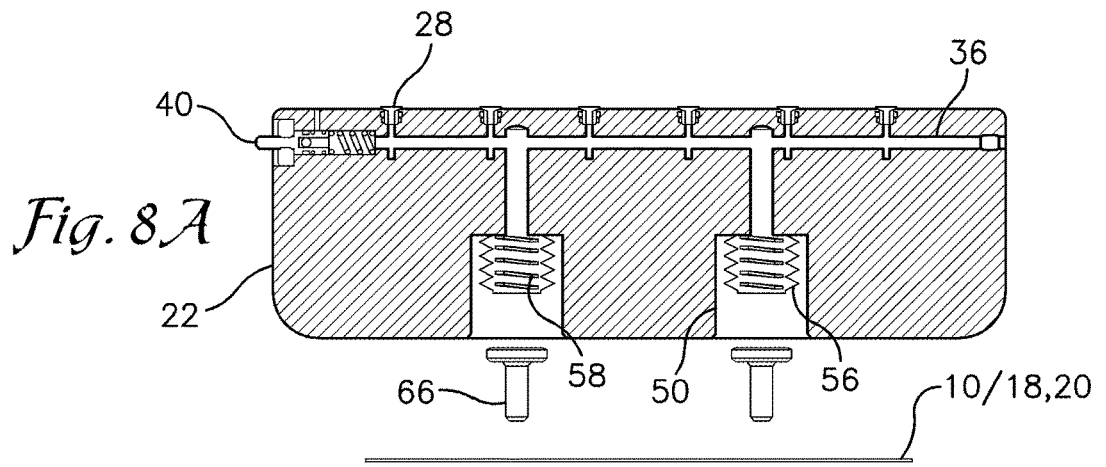
FIGS. 8A, 8B, 8C, and 8D are cross-sectional views of a mover depicting a vacuum charging sequence useable for handling a carton in accordance with an exemplary embodiment.
Figure 8B:
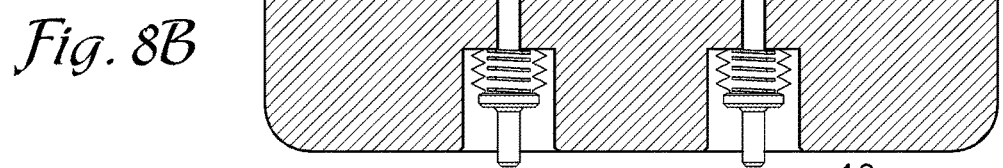
Figure 8C:
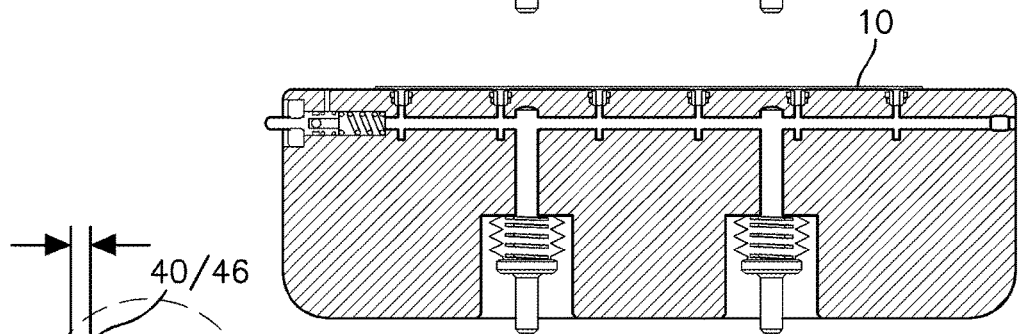

As depicted in FIGS. 7A-B and 8A-D, the vacuum system 30 is actuated to retain the carton 10 in the mover 22. FIG. 8A shows the mover 22 prior to disposal of the carton 10 therein and positioning of the mover 22 over one or more charging pistons 66 via the conveyance system. FIG. 8B depicts the charging pistons 66 being actuated to rise into contact with the endwalls 62 of the bellows 56 along a bottom of the mover 22. The charging pistons 66 extend to compress the bellows 56 and thereby force air from the vacuum-system 30 and to decrease the volume of the system 30. The charging pistons 66 can be actuated prior to disposal of the carton 10 into the mover 22 as shown in FIG. 8B or simultaneously with such disposal or after disposal into the mover 22.

Figure 8D:
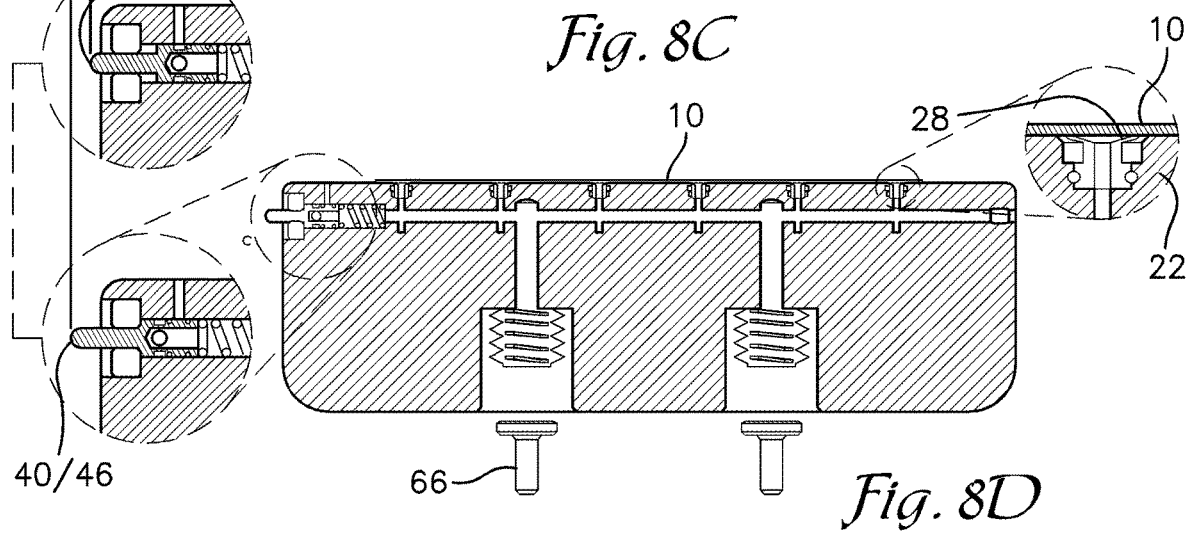

The charging pistons 66 are retained in the extended position until the longitudinal and transverse flanges 18, 20 contact the suction cups 28 or the top surface of the mover 22. The charging pistons 66 may then be withdrawn as depicted in FIG. 8D, allowing the coil springs 58 to urge the bellows 56 back to their expanded state and thereby to draw a partial vacuum within the system 30. The partial vacuum provides a suction force or adherence between the suction cups 28 and the respective longitudinal and transverse flanges 18, 20 that operates to retain the carton 10 within the depression 26 of the mover 22.

Figure 4:
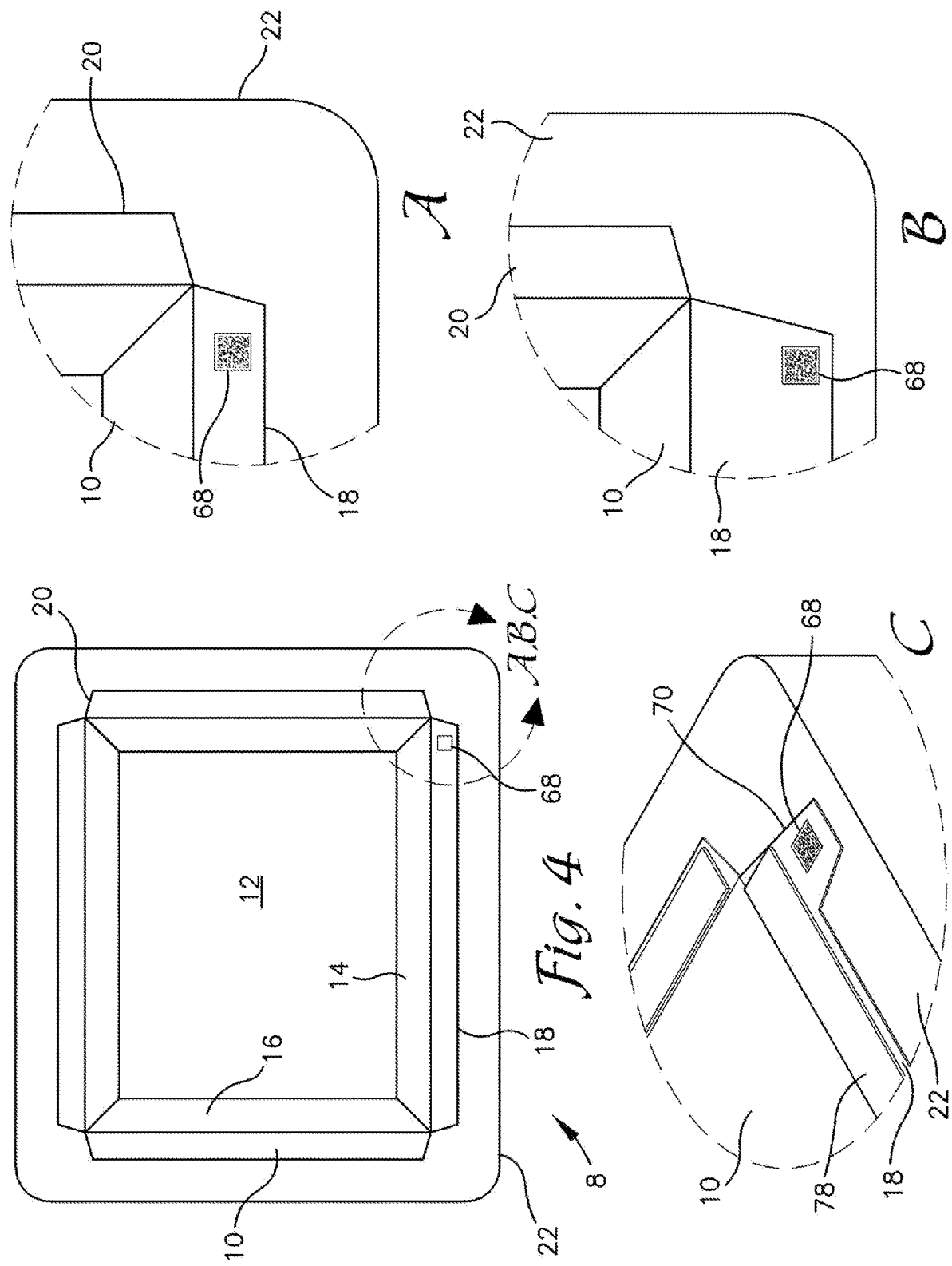
FIG. 4 is a plan view of a mover with a carton disposed therein and three enlarged views depicting embodiments of longitudinal flange configurations that may be employed in exemplary embodiments: A depicts longitudinal and transverse flanges of equal width; B depicts an enlarged longitudinal flange; and C depicts a longitudinal flange with a tab extending therefrom in accordance with an exemplary embodiment.

As depicted in FIG. 4, an identifying indicia, such as a license plate number (LPN) 68 may be printed on the carton 10 for example, on one or more of the longitudinal or transverse flanges 18, 20. The LPN 68 preferably comprises a quick read (QR) code or bar code but any available indicia may be employed. The LPN 68 may be printed on the carton 10 following placement into the mover 22 or at any time prior thereto. The flanges 18, 20 may be configured to enable scanning of the LPN 68 following a lidding operation described more fully below. For example, one of the flanges 18, 20 may be provided with a wider flange 18, 20 (FIG. 4B) or a tab 70 (FIG. 4C) such that the LPN 68 may be printed outside of a gumming area and/or perimeter of a lid 80 applied to the carton 10. The additional width of the flange 18, 20 and/or the tab 70 may be trimmed off following lidding as desired.

Following disposal of the carton 10 in the mover 22, the LPN 68 may be scanned or read along with the RFID chip 27 in the mover 22 and the two indicia recorded and/or married together within an associated tracking system. The carton 10 and/or the mover 22 is further associated with a particular order to be fulfilled. The mover 22/carton 10 is moved about the facility via the conveyance systems therein and items 72 are picked and placed into the carton 10 via manual or automated means. For example, the mover 22 may be moved through one or more stations at which items 72 may be manually picked from a stock and placed into the carton 10, previously picked items 72 may be manually or automatically moved from a tote into the carton 10, or robotic or automated means may pick and place items 72 from a stock supply into the carton 10, among other packing options.

Figure 5:
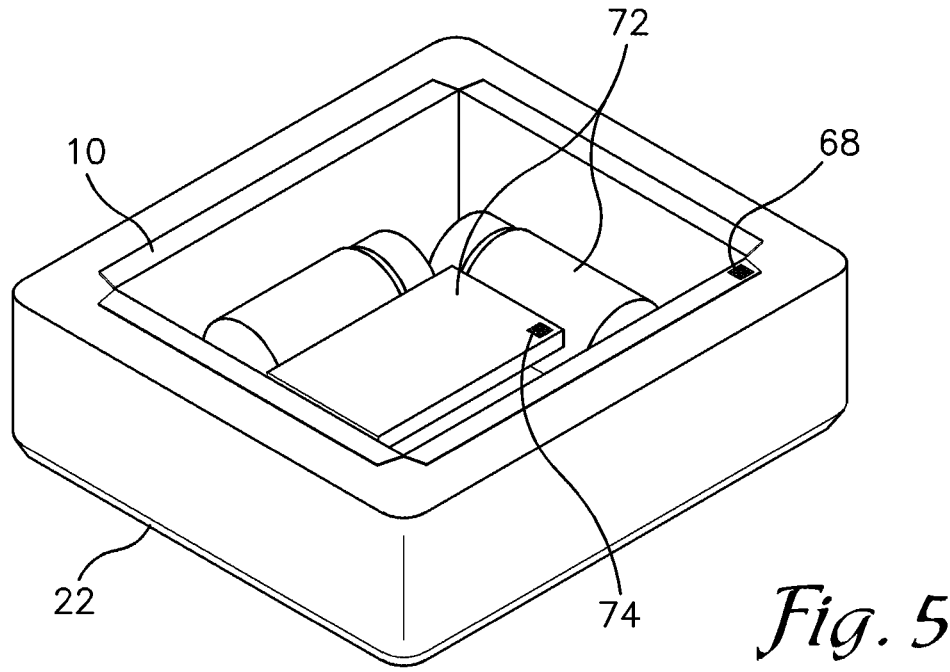
FIG. 5 is a perspective view of a mover with a carton disposed therein and items disposed in the carton depicted in accordance with an exemplary embodiment.
Figure 6:
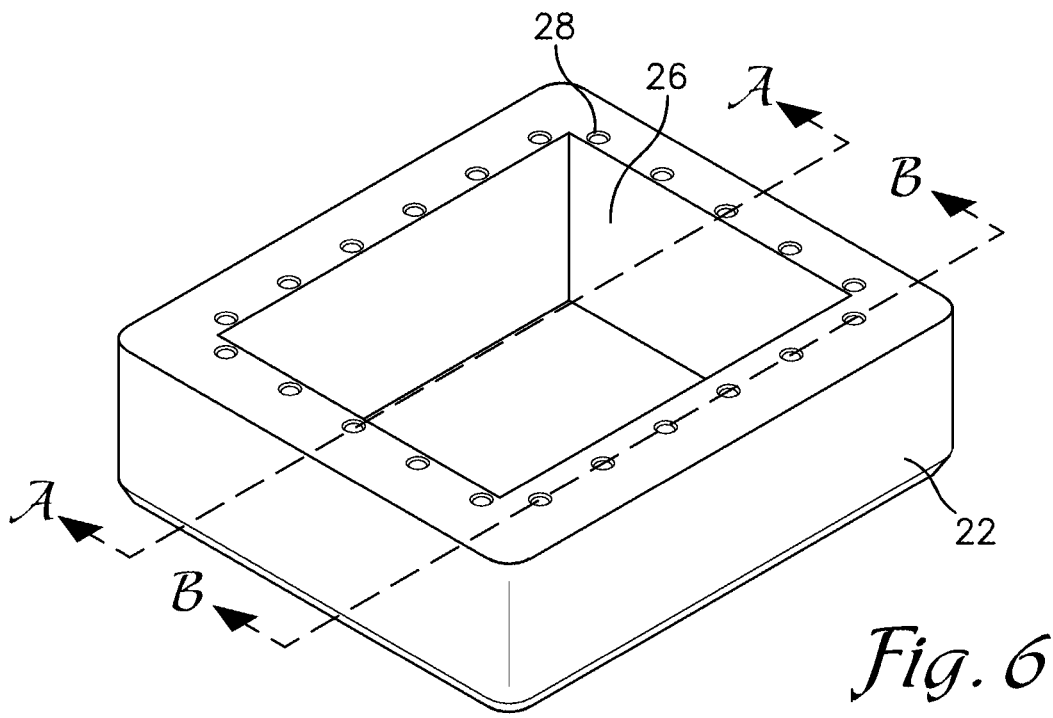
FIG. 6 is a perspective view of a mover depicted in accordance with an exemplary embodiment.
Figure 7A:
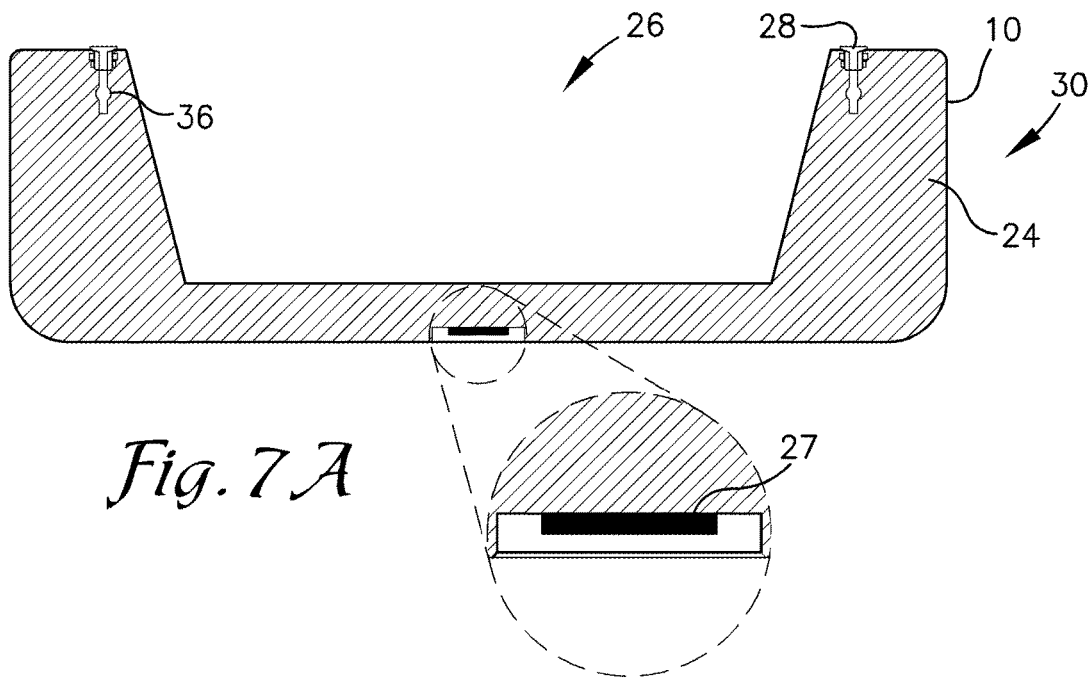
FIGS. 7A and 7B are a pair of cross-sectional views of the mover of FIG. 9 depicted in accordance with an exemplary embodiment.
Figure 7B:
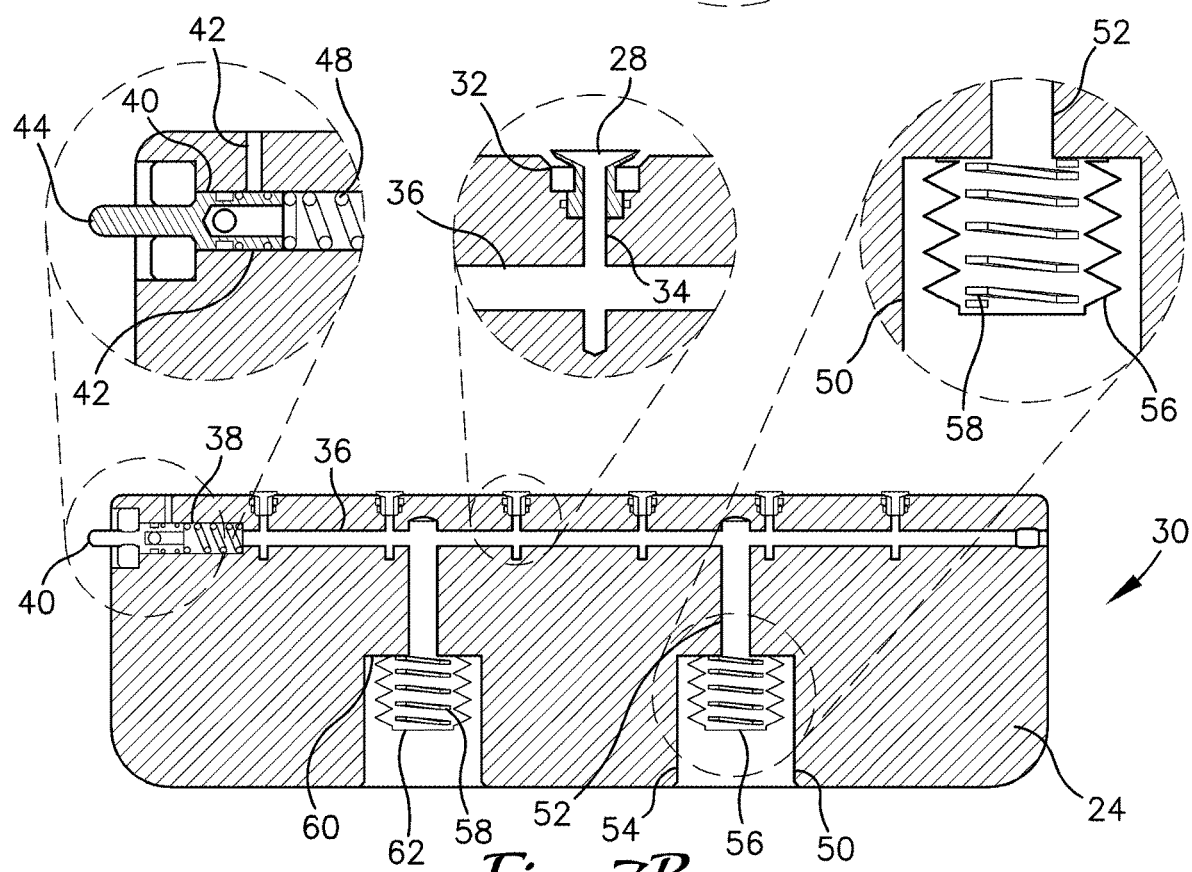

As depicted in FIG. 5, one or more of the items 72 may include an item indicia 74 that is scanned and recorded/married with the LPN 68 and/or the RFID chip 27. In some embodiments, one or more documents associated with the order may also be disposed in the carton 10 and may include an item indicia 74 that is scanned. This may ensure that proper or required documentation associated with the order is disposed in the carton 10. For example, where the order comprises one or more pharmaceuticals, drugs, or medical supplies, associated documentation, instructions or the like may be required to accompany the items 72.

In some embodiments, such as where the carton 10 is employed in a pharmaceutical fulfillment operation, a pharmacist or other operator may verify the items 72 in the carton 10 either manually or through an automated verification system. Such may be completed by scanning the LPN 68 and/or the RFID chip 27 to access an order listing associated with the carton 10 and visually verifying the items 72 therein. Or the items 72 may include indicia thereon that can also be scanned manually or automatically to verify their accuracy.

Following placement of the desired items 72 in the carton 10 and any desired verification steps, the carton 10/mover 22 is transported by the conveyance system to a lidding operation 76. As depicted schematically in FIG. 9, the lidding operation 76 includes a pair of gumming steps. In a first step, the mover 22 may be stopped by the conveyance system to allow one or a pair of rollers 77 to apply a layer of gum 78 to the transverse flanges 20 of the carton 10. The gum 78 may comprise a desired adhesive, glue, or the like that is suitable to affix the lid to the carton 10. The mover 22 is next moved to a second gumming step in which the mover 22 is again stopped or is moved beneath a second gumming roller 79 to apply the gum 78 to the longitudinal flanges 18 of the carton 10. Although the gumming steps are described as using rollers, it is understood that the gum 78 may be applied by other means including being sprayed, painted, or otherwise applied to the flanges 18, 20.

Figure 9:
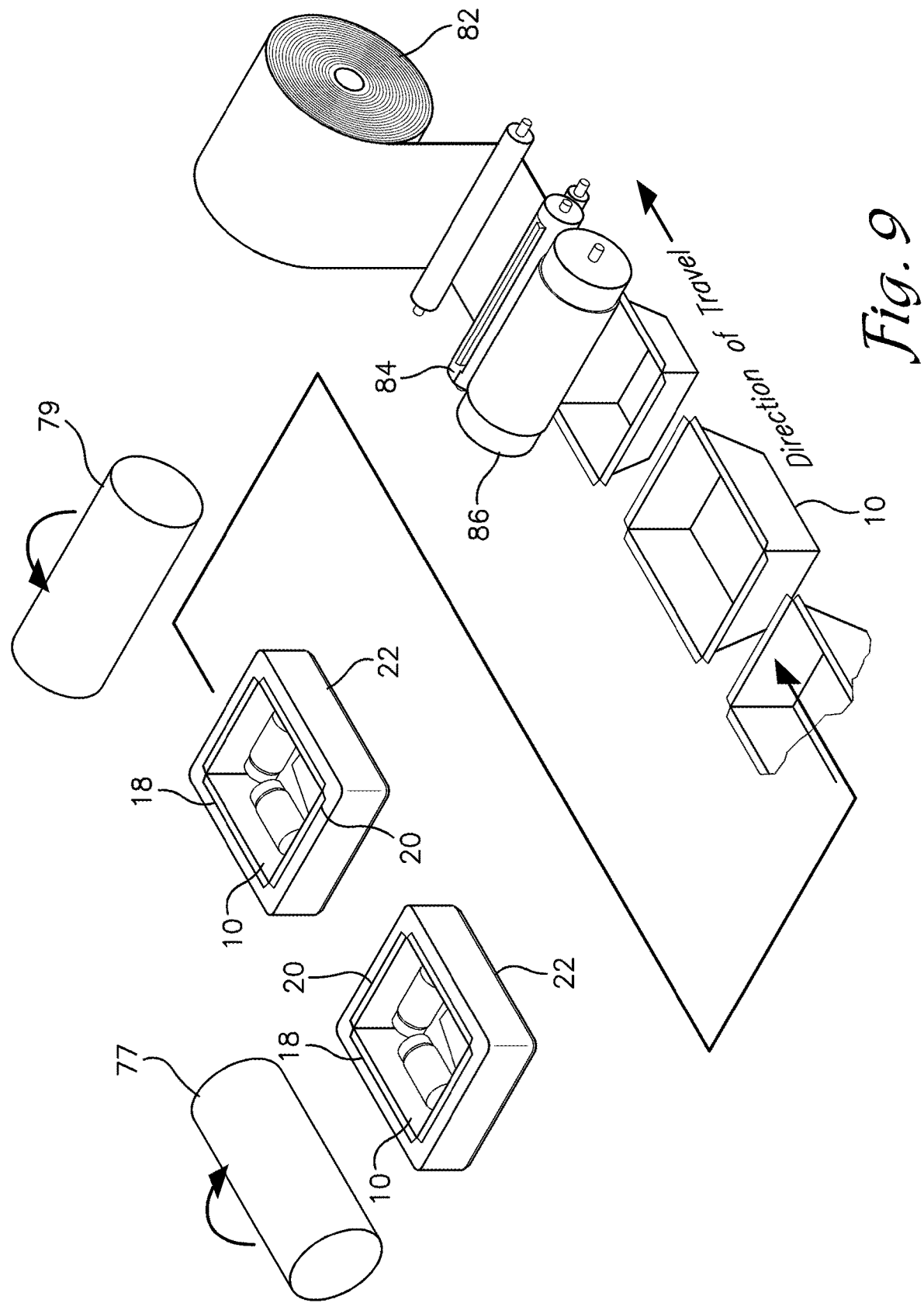
FIG. 9 is schematic view of a lidding operation that employs a roll stock for forming carton lids depicted in accordance with an exemplary embodiment.
Figure 10:
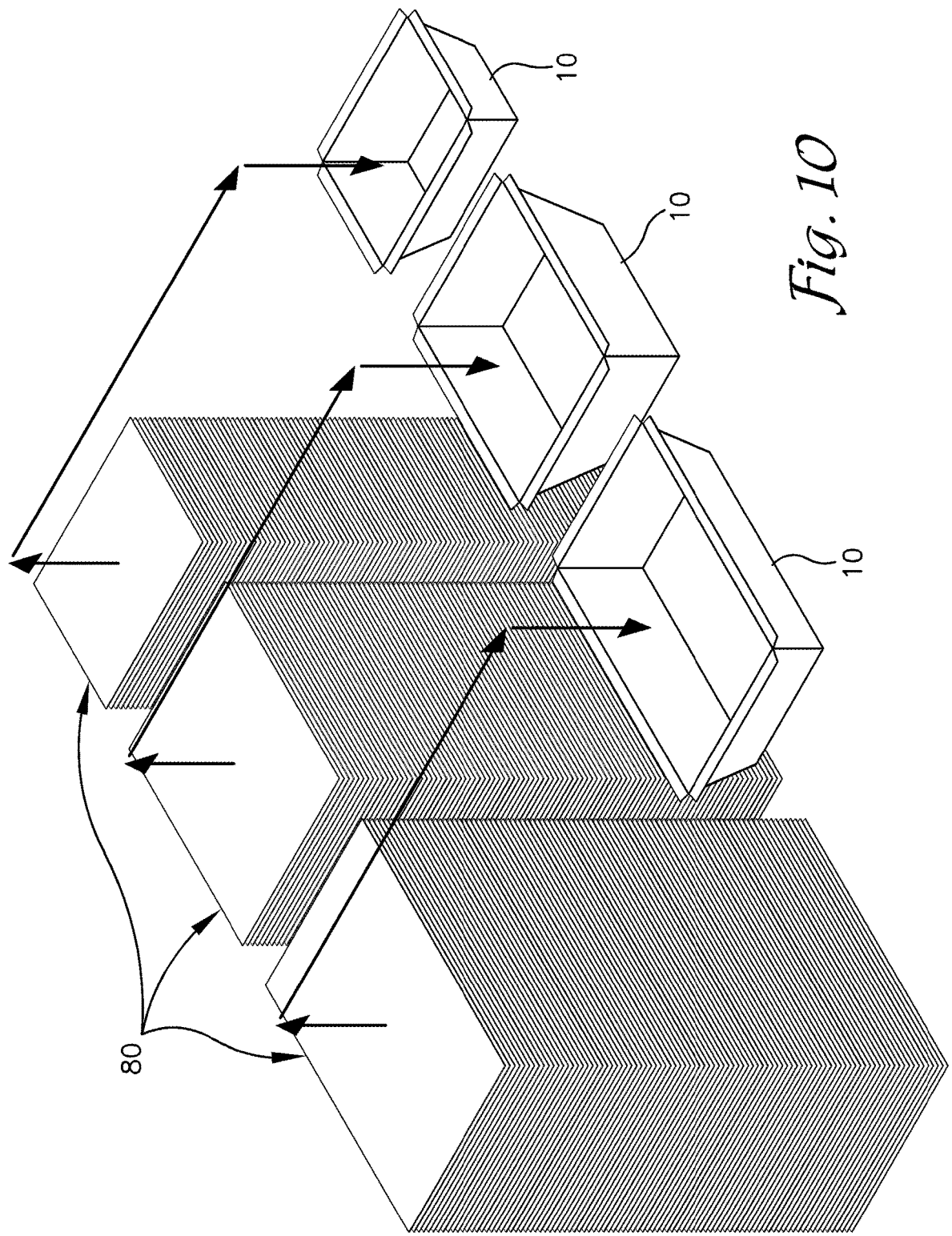
FIG. 10 is an illustrative view of a plurality of cartons and stacks of lid stock for use in a lidding operation depicted in accordance with an exemplary embodiment.

A lid 80 is next applied to the carton 10. The lid 80 may formed from a rolled material stock 82 as depicted in FIG. 9 or may be pre-formed/pre-cut and provided in a stacked configuration as depicted in FIG. 10. In either configuration, dimensions of the lid 80 may be continuous, i.e. each carton 10 and lid 80 have the same length and width dimensions, or the dimensions of the carton 10 may be detected such as by using one or more sensors disposed along the conveyance system or by cross-referencing data associated with the LPN 68 or the RFID chip 27 and recorded in a tracking system.

As depicted in FIG. 9, the rolled material stock 82 may be passed through or around a variety or rollers including a cutting roller 84 that cuts the stock 82 to the desired dimensions. The cut stock 82 or now lid 80 may then be passed onto a vacuum roller 86 which applies to the lid 80 to the carton 10 as the carton 10 passes thereby. The lid 80 is pressed into contact with the gum 78 to adhere the lid 80 to the carton 10 and thus seal the items 72 inside the carton 10. Although not shown in FIG. 9, the cartons 10 are retained in the movers 22 during the lidding operation. When, as depicted in FIG. 10 precut lids 80 are employed instead of rolled material stock 82, the lids 80 may be picked via manual or automated means from stacks of lids 80 and placed onto the cartons 10 which have had their flanges 18, 20 gummed in a manner like that described above.

Figure 11:
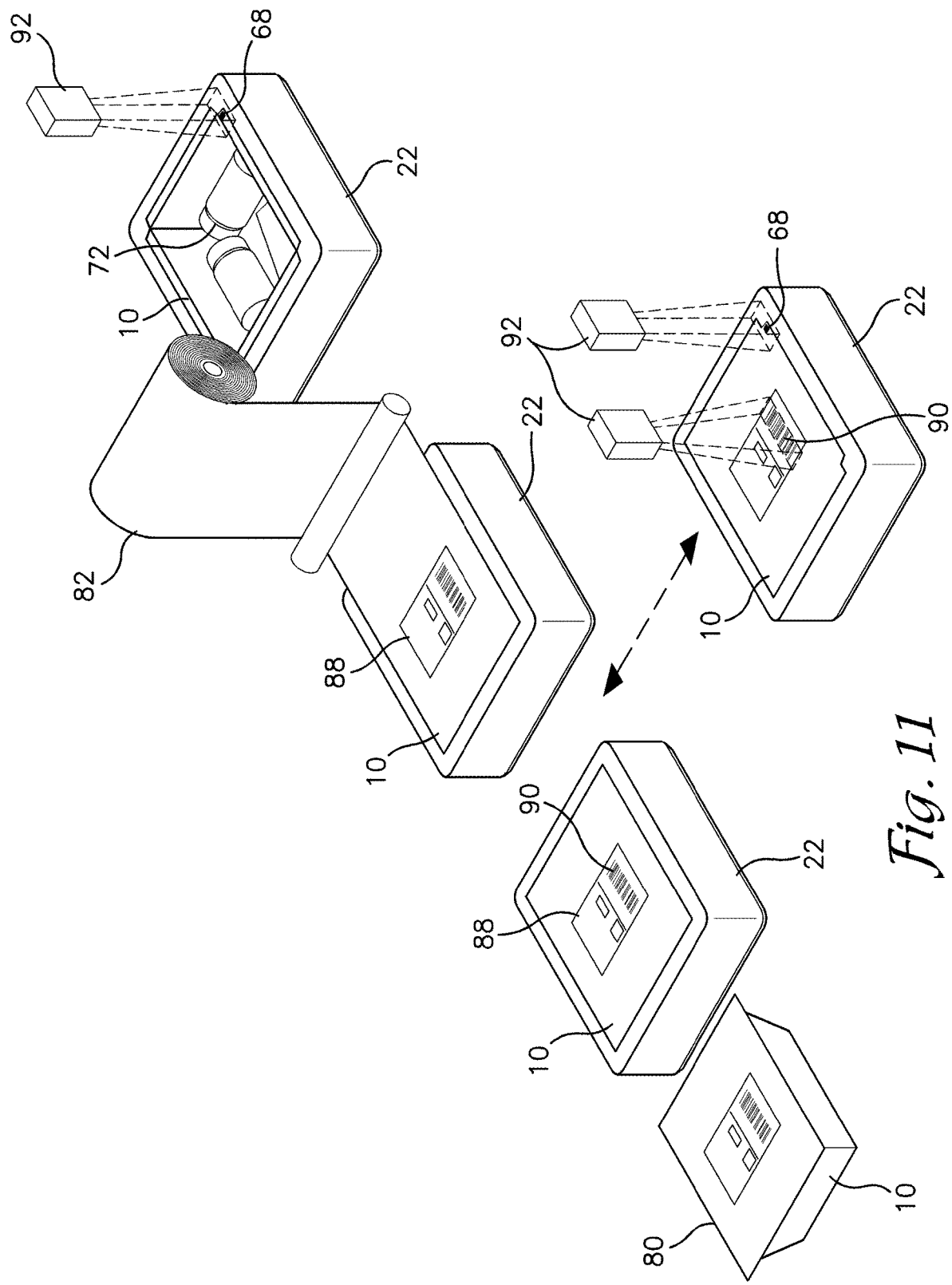
FIG. 11 is a schematic view depicting lidding, labeling, verification, and dismounting of a carton depicted in accordance with an exemplary embodiment.

With reference now to FIG. 11, following the lidding operation, a label 88 is applied to or printed on the lid 80. The label 88 may include any desired indicia useable to identify the carton 10, the items 72 contained therein, an order associated with the carton 10/items 72, or the like. For example, the label 88 may include a shipping address and contact information associated with a consumer that placed an order for the items 72 contained in the carton 10. The label 88 may also include a barcode or similar machine-readable indicia 90 that can be used to access similar information or other information associated with the items 72 or the order. In some embodiments, the label 88 is printed and applied and then the indicia 90 thereon is scanned along with the LPN 68 on the carton 10 and/or the RFID chip 27 in the mover 22 by one or more scanners 92 and the data cross referenced to ensure their accuracy.

In embodiments, like that depicted in FIG. 4A, the gum 78 and the lid 80 obstruct the LPN 68 and thus, the LPN 68 may be scanned prior to application of the lid 80, as depicted in FIG. 11. In other embodiments, like those depicted in FIGS. 4B-C, the flange 20 extends beyond the applied gum 78 and the perimeter of the lid 80 such that LPN 68 remains visible following their application, as alternatively depicted by the dashed arrow in FIG. 11. In such embodiments, the additional width of the flange 20 or the tab 70 may be removed or cut away from the carton 10 following the lidding operation and/or any verification steps.

The mover 22 can now be moved as desired to transport the completed carton 10 to a sorting station or other location for further handling and removal from the mover 22. With reference again to FIG. 8, to remove the carton 10 from the mover 22 the valve 40 on the mover 22 is actuated to open the relief port 42 and relieve the vacuum in the vacuum system 30. The suction or adherence between the flanges 18, 20 and the suction cups 28 is thus relieved and the carton 10, with lid 80 and label 88 affixed thereto, can be removed from the mover 22. The carton 10 is preferably extracted from the mover 22 by an automated system that lifts the carton 10 from the mover 22, but the mover 22 might also be tipped to dump the carton 10 therefrom via gravity or the carton 10 might be manually removed, among other options. The empty mover 22 may then be returned to a que to await a next carton 10.

Figure 12:
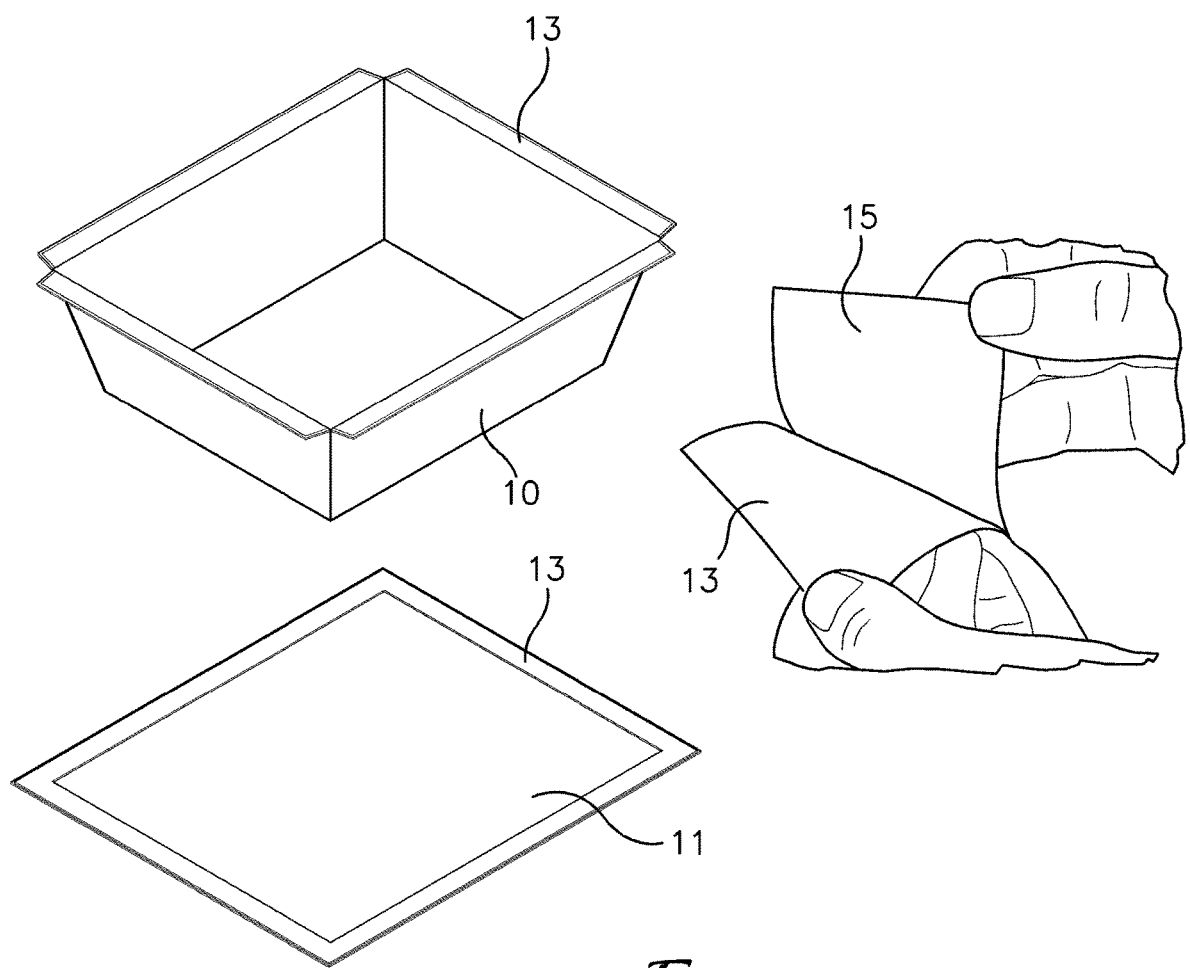
FIG. 12 is a schematic view of a manual lidding operation employing a carton and a manually placed carton lid in accordance with an exemplary embodiment.
Figure 13:
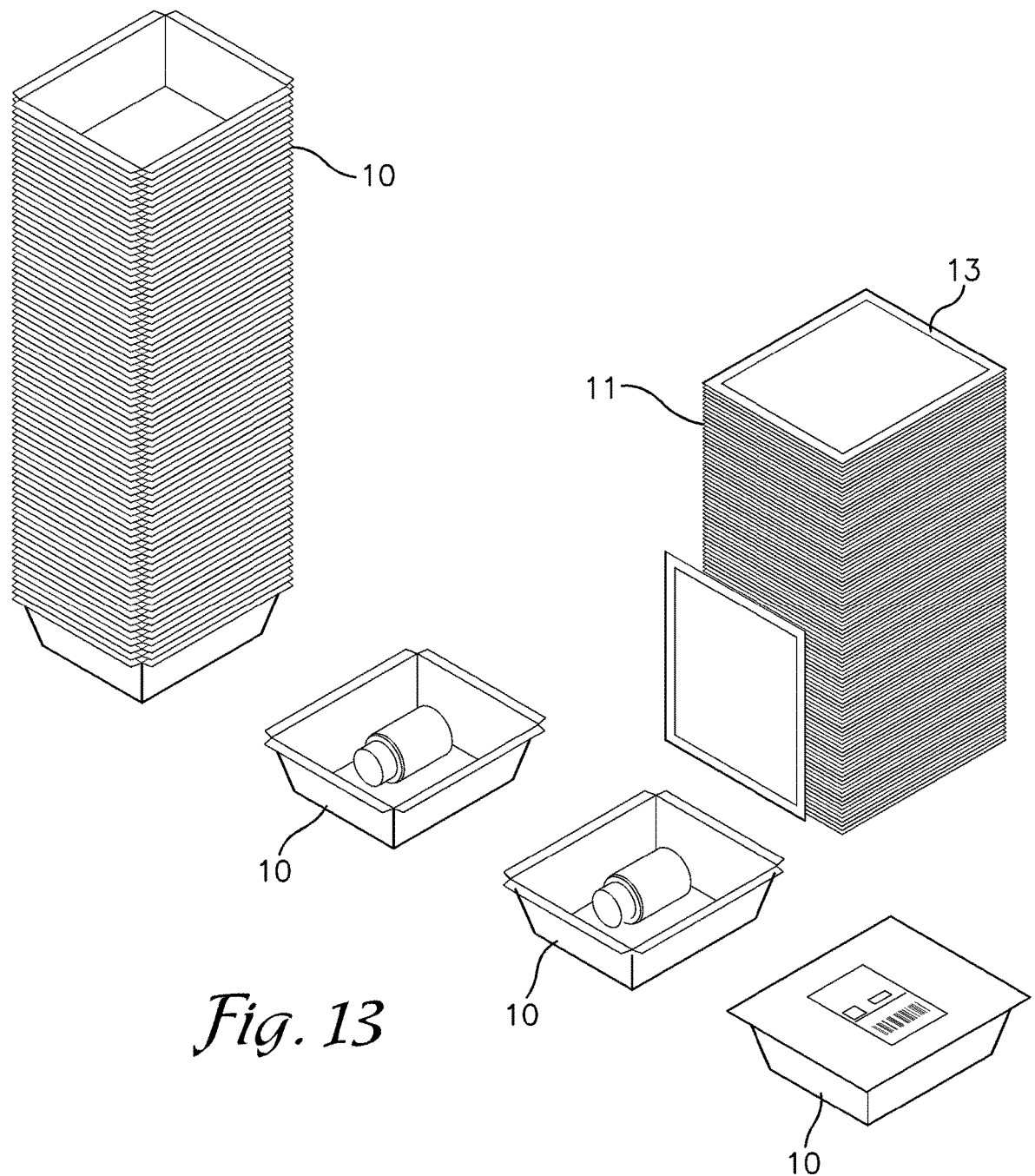
FIG. 13 is a schematic view of a manual lidding operation with magazines for cartons and carton lids, with attachment adhesive on the carton lids in accordance with an exemplary embodiment.
Figure 14:
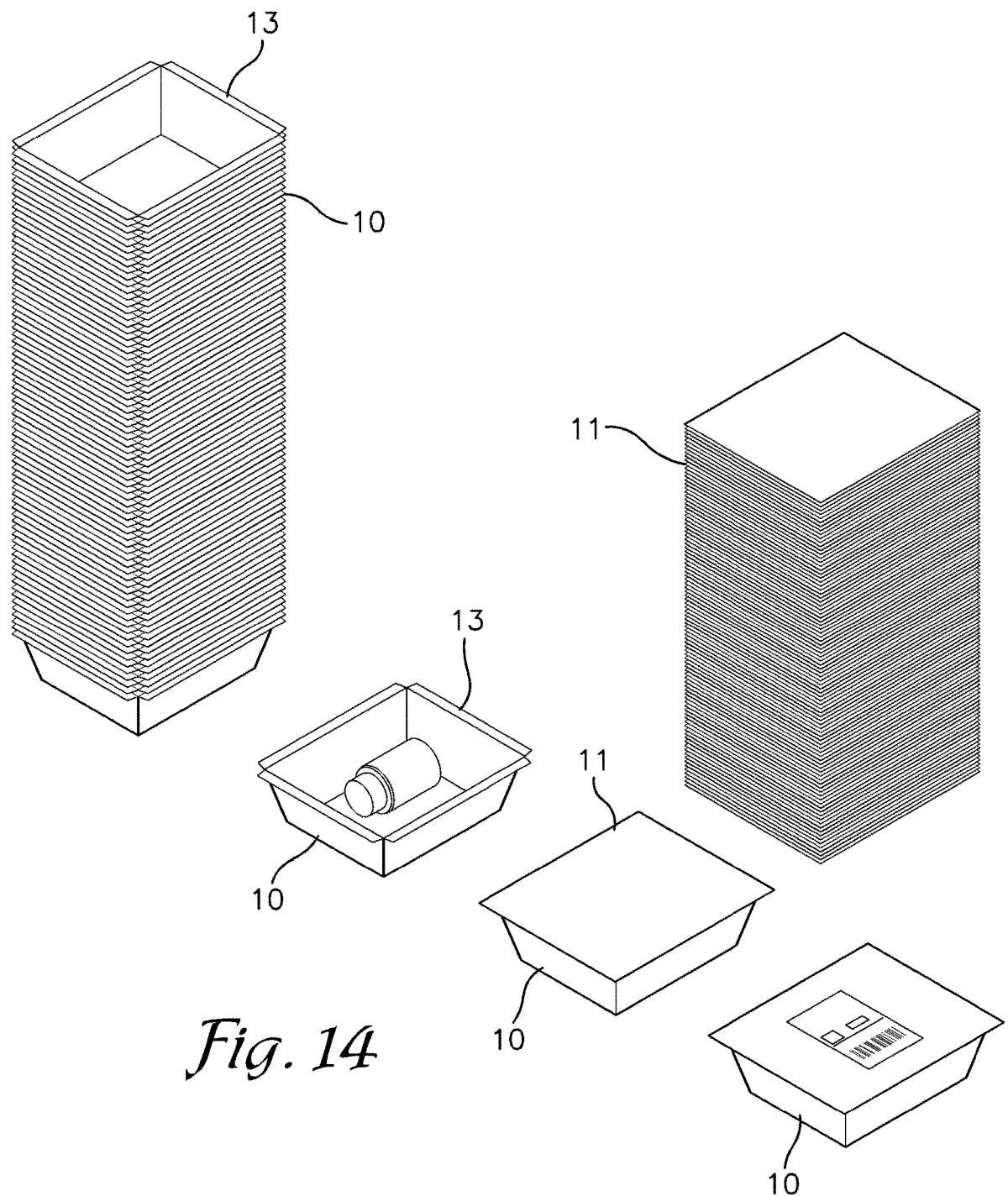
FIG. 14 is a schematic view of a manual lidding operation with magazines for cartons and carton lids, with attachment adhesive on the cartons in accordance with an exemplary embodiment.

Looking to FIGS. 12 through 14, in an alternative embodiment of the present invention, a manual carton handling and order fulfillment system includes a carton 10 as previously described, with a pre-cut carton lid 11 configured to cover the open top of the carton 10 and to adhere to the flanges of the carton to secure the lid to the carton.

As seen in FIG. 12, one or more adhesive strips 13, each having a pull-away protective cover 15, is affixed to one or more of the flanges around the open top of the carton 10, and/or is affixed to one or more corresponding edges of the pre-cut carton lid 11. It should be understood that the adhesive strips may be positioned on each of the flanges of the carton 10, may be positioned on each of the edges of the pre-cut lid, or may be positioned in combinations thereof.

As seen in FIG. 13, in one embodiment of the present invention, a stack of cartons 10 allows a user to pick a single carton for loading an item for packaging and shipping. A stack of pre-cut lids 11, each having an adhesive strip 13 positioned along each of its edges, allows a user to pick a single lid 11 for adhering to the flanges of the carton 10.

Looking to FIG. 14, in another embodiment of the present invention, a stack of cartons 10 having an adhesive strip on each of the flanges surrounding the open top of the carton allows a user to pick a single carton for loading an item for packaging and shipping. A stack of pre-cut lids allows a user to pick a single lid for adhering to the adhesive strips on the flanges of the carton.

Thus, it can be seen that the manual carton-handling and order fulfillment system allows a user to quickly and easily pack and seal pre-cut lids 11 to cartons 10 without having to separately apply tape or other adhesive to the lids or cartons.

Many different arrangements of the various components depicted, as well as components not shown, are possible without departing from the scope of the description provided herein. Exemplary embodiments have been described with the intent to be illustrative rather than restrictive. Alternative embodiments will become apparent to readers of this disclosure after and because of reading it. Alternative means of implementing the aforementioned can be completed without departing from the scope of exemplary embodiments described herein. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of exemplary embodiments described herein.

What is claimed is:

1. A carton-handling and order fulfillment system, comprising:
    a carton configured to receive and contain items for shipping, the carton including a first identifying indicia;
    a mover comprising a body having a top surface with a depression formed in the top surface that is configured to nestably receive the carton, the mover including a second identifying indicia; and
    a conveyance system configured to receive and carry a plurality of movers; wherein:
    the first identifying indicia of the carton and the second identifying indicia of the mover are married together, and the mover and the carton nestably received therein are moved via the conveyance system to fulfill an order; and
    the mover comprises a vacuum charging system configured to apply a suction force to retain the carton within the depression as the mover is moved via the conveyance system to pick and place the items into the carton to fulfill the order, the vacuum charging system comprising a plurality of suction cups disposed about a perimeter of the depression of the mover and configured to engage the carton.

2. The carton-handling and order fulfillment system of claim 1, wherein the carton comprises a pre-formed, polygonal container having an open top.

3. The carton-handling and order fulfillment system of claim 2, wherein the carton comprises a four-sided pyramidal form such that a plurality of cartons can be nestably stacked.

4. The carton-handling and order fulfillment system of claim 2, wherein the carton comprises a plurality of flanges extending outwardly around the open top of the carton, the flanges configured to receive a carton top to cover the carton.

5. The carton-handling and order fulfillment system of claim 1, wherein the plurality of suction cups are configured to engage with one or more flanges of the carton.

6. The carton-handling and order fulfillment system of claim 1, wherein the mover comprises an identifying RFID chip.

7. The carton-handling and order fulfillment system of claim 1, further comprising a lidding system configured to apply a carton lid to the carton.

8. The carton-handling and order fulfillment system of claim 7, wherein the lidding system comprises a gumming system operable to apply an adhesive to transverse flanges arranged around an open top of the carton.

9. The carton-handling and order fulfilment system of claim 7, wherein the lidding system comprises a rolled material stock dispenser configured to dispense and cut a length of material stock to form the carton lid for the carton.

10. The carton-handling and order fulfillment system of claim 1, wherein the conveyance system independently moves each of the plurality of movers within the conveyance system.

11. The carton-handling and order fulfillment system of claim 1, wherein the first identifying indicia comprises an identifying LPN.

12. The carton-handling and order fulfillment system of claim 1, wherein the second identifying indicia comprises an RFID.

13. The carton-handling and order fulfillment system of claim 1, wherein the mover is configured to handle cartons of a variety of dimensions.

14. A carton-handling and order fulfillment system, comprising:
- one or more items for shipping;
- a carton configured to receive and contain the one or more items, the carton including a first identifying indicia;
- a mover for transporting the carton, the mover including a second identifying indicia that is married to the first identifying indicia of the carton; and
- a conveyance system configured to receive and carry a plurality of movers, each of the plurality of movers including a respective second identifying indicia that is married to a respective first identifying indicia of a carton transported thereon; wherein:
- the first identifying indicia and the second identifying indicia are associated with an order including the one or more items;
- each of the plurality of movers is independently moveable on the conveyance system to pick and place the one or more items into the carton transported thereon; and
- the one or more items include item indicia that is scanned and married to the first identifying indicia and the second identifying indicia when the one or more items are picked and placed into the carton.

15. The carton-handling and order fulfillment system of claim 14, wherein the carton comprises a pre-formed, polygonal container having an open top.

16. The carton-handling and order fulfillment system of claim 14, wherein the mover comprises a vacuum-charging system having a suction cup configured to apply a suction force to retain the carton thereon.

17. The carton-handling and order fulfillment system of claim 14, further comprising a lidding system configured to apply a carton lid to the carton.

18. The carton-handling and order fulfillment system of claim 14, wherein the first identifying indicia comprises an identifying LPN.

19. The carton-handling and order fulfillment system of claim 14, wherein the second identifying indicia comprises an RFID.

20. The carton-handling and order fulfillment system of claim 14, wherein the mover is configured to handle cartons of a variety of dimensions.

* * * * *